US010458375B1

(12) United States Patent
Lawrence et al.

(10) Patent No.: US 10,458,375 B1
(45) Date of Patent: Oct. 29, 2019

(54) AIR SHUTOFF VALVE

(71) Applicant: Caterpillar Inc., Deerfield, IL (US)

(72) Inventors: Rodney A. Lawrence, Frankfort, IN (US); Brandyn A. Stack, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/987,599

(22) Filed: May 23, 2018

(51) Int. Cl.
| | |
|---|---|
| *F16K 3/02* | (2006.01) |
| *F02M 35/10* | (2006.01) |
| *F16K 31/46* | (2006.01) |
| *F16K 31/524* | (2006.01) |
| *F16K 35/02* | (2006.01) |

(52) U.S. Cl.
CPC ..... *F02M 35/10255* (2013.01); *F16K 3/0254* (2013.01); *F16K 3/0281* (2013.01); *F16K 31/465* (2013.01); *F16K 31/52416* (2013.01); *F16K 35/025* (2013.01)

(58) Field of Classification Search
CPC ............ F02M 35/10255; F16K 35/025; F16K 31/52416; F16K 31/465; F16K 3/0281; F16K 3/0254; F16K 35/022; F16K 31/52408; F16K 31/524; F16K 31/52
USPC .................. 251/326–329, 251–263, 111, 294
See application file for complete search history.

(56) References Cited

U.S. PATENT DOCUMENTS

| | | | |
|---|---|---|---|
| 789,132 A * | 5/1905 | Bachman ............... | F16K 3/312 138/94.3 |
| 2,884,222 A * | 4/1959 | Oakes ................... | F16K 3/0254 251/327 |
| 4,422,418 A | 12/1983 | Dorn | |
| 4,501,238 A * | 2/1985 | Odum ...................... | F02D 9/14 123/198 D |
| 4,537,386 A * | 8/1985 | Krepela ................ | F16K 31/563 251/302 |
| 4,546,954 A * | 10/1985 | Bodnar ..................... | F16K 3/04 251/113 |
| 4,871,143 A * | 10/1989 | Baker ................... | F16K 3/0254 251/58 |
| 6,032,921 A | 3/2000 | Krepela | |
| 6,273,053 B1 | 8/2001 | Krepela et al. | |
| 2003/0056754 A1 | 3/2003 | Prysko | |
| 2013/0068984 A1 | 3/2013 | Molavi et al. | |

FOREIGN PATENT DOCUMENTS

JP 4992152 B2 8/2012

* cited by examiner

*Primary Examiner* — John Bastianelli
(74) *Attorney, Agent, or Firm* — Leydig, Voit & Mayer, Ltd.

(57) ABSTRACT

An air shutoff valve for use on an internal combustion engine includes a gate that is moveable between armed and triggered positions by springs when a retention pin is retracted and allows a spring loaded retention pin to retract and release the gate, which is also spring loaded, to drop. The retention pin is operated by an actuator through a cam mechanism.

20 Claims, 8 Drawing Sheets

AIR SHUTOFF VALVE

TECHNICAL FIELD

This patent disclosure relates generally to internal combustion engines and, more particularly, to air shutoff valves used on internal combustion engines.

BACKGROUND

Certain types of internal combustion engines, including engines that include reciprocating pistons, are typically operated by controlling either the air or fuel provided into engine cylinders. For example, spark ignition engines such as gas or gasoline engines control engine speed by metering an amount of air that is provided to the engine, measuring the amount of air, and providing a controlled amount of fuel to achieve a desired air/fuel ratio. Similarly, compression combustion engines such as diesel or oil engines control engine speed by metering the amount of fuel that is provided to the engine's cylinders. In any event, internal combustion engines require at least air and fuel to form a combustible air/fuel mixture in the engine's cylinders to operate. If providing fuel, or air, is discontinued, then engine operation would be discontinued or prevented from initiating.

In certain conditions, for example, in the presence of a failure, it is desirable to inhibit engine operation for reasons of safety. In yet other conditions, a failure in an engine component may result in an uncontrolled flow of fuel (or air) into the engine, which can create a condition of uncontrolled engine operation. One previously proposed solution at disabling engine operation during either a safety lockout or in the presence of an engine component failure is to introduce an air shutoff valve at a point in the engine's air intake system, which operates to shut off an airflow into the engine.

One example of an air shutoff valve that has been proposed in the past can be found in U.S. Pat. No. 4,546,954, which was granted on Oct. 15, 1985. This reference describes an air shutoff valve having a paddle-shaped valve element that includes a circular gate and an actuation arm. The actuation arm pivots at one end under a force of an actuator (see, e.g., FIG. 3a) to swing the gate valve into and out from an air passage opening.

One disadvantage of existing air shutoff valves such as the valve described in the '954 patent mentioned above, is that a large actuator force is required to move the valve element when the valve is required to be used. Moreover, placement of the valve on the engine's intake system, which is usually high on the engine, subjects the valve to vibration and wear of internal components such as linkages and the like.

SUMMARY

The disclosure describes, in one aspect, an air shutoff valve for use on an internal combustion engine. The air shutoff valve includes a body having an inlet portion forming an inlet opening, an outlet portion forming an outlet opening, a gate portion and an actuator portion. The body forms an air passage that fluidly connects the inlet opening and the outlet opening. The gate is slidably disposed in the gate portion of the body. The gate is selectively moveable between an armed position and a triggered position, in which triggered position the gate is disposed in the air passage and fluidly blocks the outlet opening from the inlet opening. A lift rod is connected to the gate and includes a transverse opening. A retention pin is slidably disposed in the actuator portion of the body and a tip extending through the transverse opening in the lift rod when the gate is in the armed position. A roller is rotatably mounted to the retention pin. A cam rod has a cam surface in contact with the roller such that axial motion of the cam rod causes a corresponding axial motion on the retention pin. An actuator is connected to the cam rod and operates to move the cam rod from the extended position to a retracted position, in which the tip of the retention pin is clear of the transverse opening. At least one spring is disposed between the body and the retention pin. The at least one spring is disposed to urge the retention pin in a direction towards the lift rod such that contact is maintained between the roller and the cam surface. At least one lift spring is disposed between the body and the gate. The at least one lift spring is disposed to urge the gate towards the triggered position.

In another aspect, the disclosure describes an air shutoff valve for an internal combustion engine. The air shutoff valve includes a gate valve element slidably disposed within a body of the valve and operating to selectively fluid connect or block an air passage, the gate valve element moving along a guillotine axis between a retracted position, in which the air passage is clear, and an extended position, in which the air passage is blocked. The air shutoff valve further includes a linear actuator operating between a default, extended actuator position and an active, retracted actuator position. A cam rod has a cam surface and is connected to the linear actuator and arranged to be moved by the actuator. A retention pin is slidably disposed in the body of the valve and has a roller disposed in contact with the cam surface such that motion of the actuator translates into motion of the retention pin. At least one spring is disposed between the body of the valve and the retention pin. The at least one spring urges the retention pin in one direction such that contact between the roller and the cam surface is maintained. A lift rod is connected to the gate valve element and has an opening that accepts therein a tip of the retention pin. At least one lift spring is disposed between the body of the valve and the gate valve element. The at least one lift spring urges the gate valve element towards the extended position.

In yet another aspect, the disclosure describes an air shutoff valve for an internal combustion engine. The air shutoff valve includes a body forming an air passage that fluidly connects and inlet opening with an outlet opening. A gate is slidably disposed in the body and is selectively moveable along a gate axis between an armed position and a triggered position, in which the air passage is fluidly blocked. A lift rod is connected to the gate and includes an opening. A retention pin is slidably disposed in the body along a retention axis and has a tip extending through the opening in the lift rod when the gate is in the armed position. A roller is rotatably associated with the retention pin, and a cam rod has a cam surface in contact with the roller. An actuator is connected to the cam rod and operates to move the cam rod along an actuator axis from the extended position to a retracted position. At least one spring is disposed between the body and the retention pin. The at least one spring is disposed to urge the retention pin in a direction towards the lift rod such that contact between the roller and the cam surface is maintained. At least one lift spring is disposed between the body and the gate. The at least one lift spring is disposed to urge the gate towards the triggered position. In one embodiment, the gate axis and the actuator axis are parallel, and the actuator axis and the retention axis are perpendicular.

DETAILED DESCRIPTION

Figure 1:
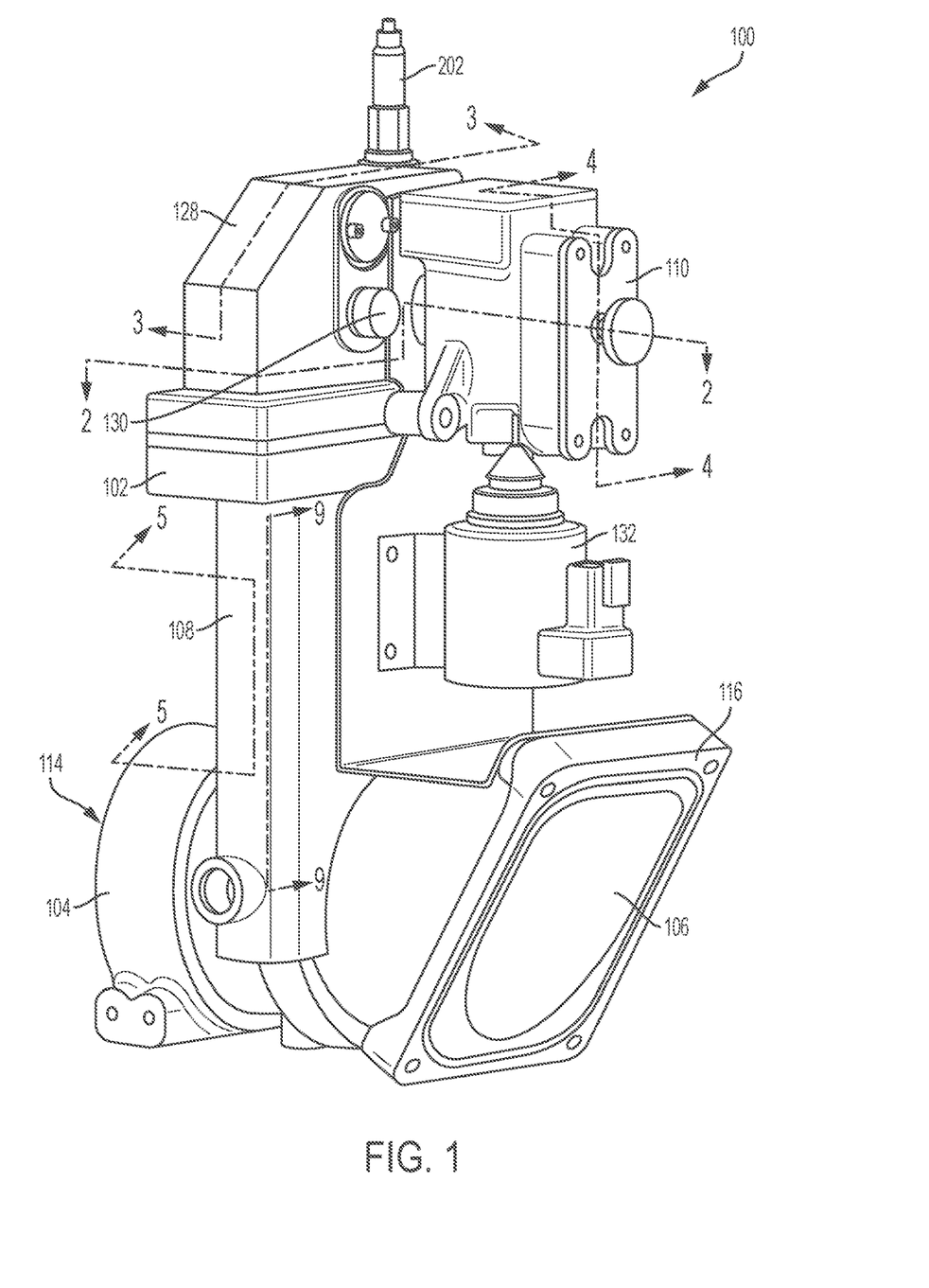
FIG. 1 is an outline view of an air shutoff valve for use with an internal combustion engine in accordance with the disclosure.
Figure 2:
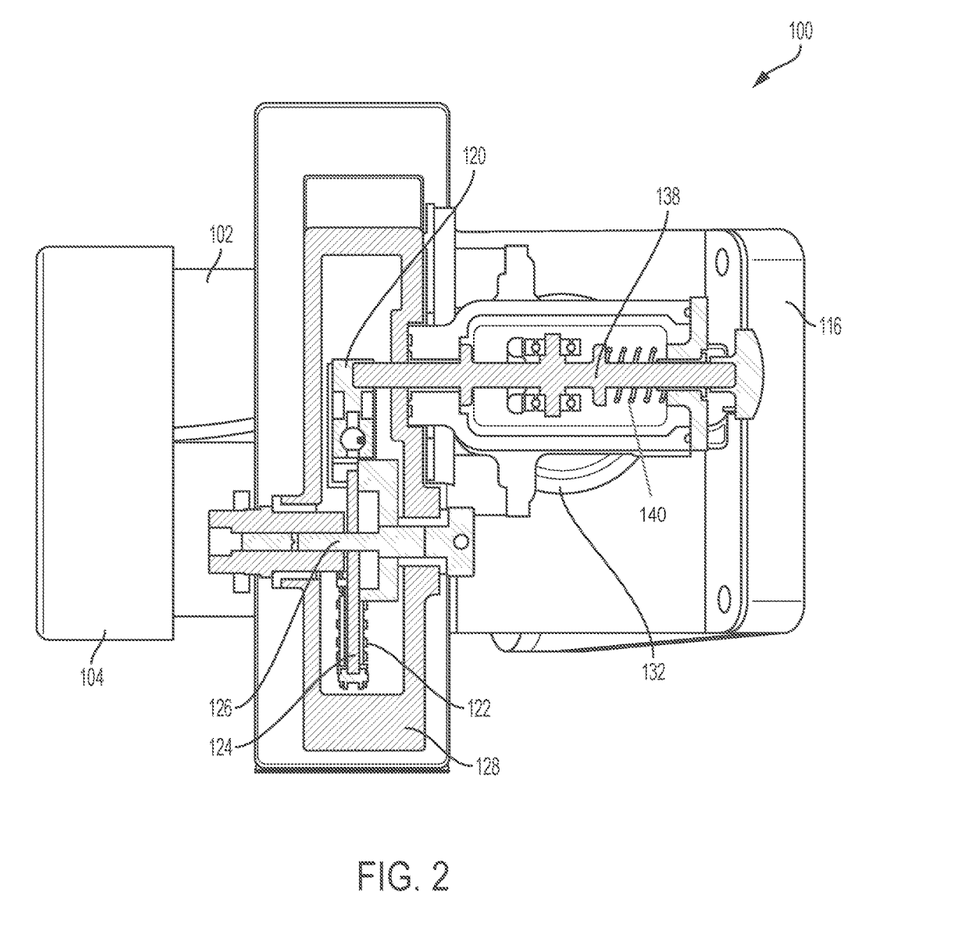
FIG. 2 is a cross section through the valve shown in FIG. 1.

An outline view of an air shutoff valve (ASO) 100 is shown in FIG. 1. The ASO 100 includes a body 102 having an inlet portion 104, an outlet portion 106, a gate portion 108, and an actuator portion 110. In the illustrated embodiment, the ASO 100 is a two-way, binary valve that can operate in an open position, in which fluid communication is permitted between the inlet and outlet portions 104 and 106, and a closed position, in which a gate valve element 112 (shown in the cross section of FIG. 3) is moved by an actuator and linkage mechanism within the actuator portion 110 to a position that blocks fluid communication between the inlet and outlet portions 104 and 106. Stated differently, the ASO 100 operates between an armed state, in which it stand ready to close if needed, and a triggered state, in which the ASO 100 is closed to prevent engine operation. As shown, the inlet portion 104 includes a female bore 114 that accepts therein an air pipe (not shown) carrying an engine inlet air stream during operation. The outlet portion 106 includes a flange 116 that is mountable with fasteners to an intake manifold (not shown) of an engine.

An air passage 118 (FIG. 5) connects the inlet and outlet portions 104 and 106 and extends through the body 102 to carry the inlet air stream from the female bore 114 to an opening in the flange 116. In this way, when the gate 112 is in the closed position, fluid transfer through the air passage 118 is blocked or prevented. When in the open position, the gate 112 is retracted into the body 102 to allow the relatively unobstructed passage of fluids through the air passage 118. The gate 112 has a generally cylindrical shape that matches the circular cross sectional flow area of the air passage 118, but other shapes can be used.

Figure 3:
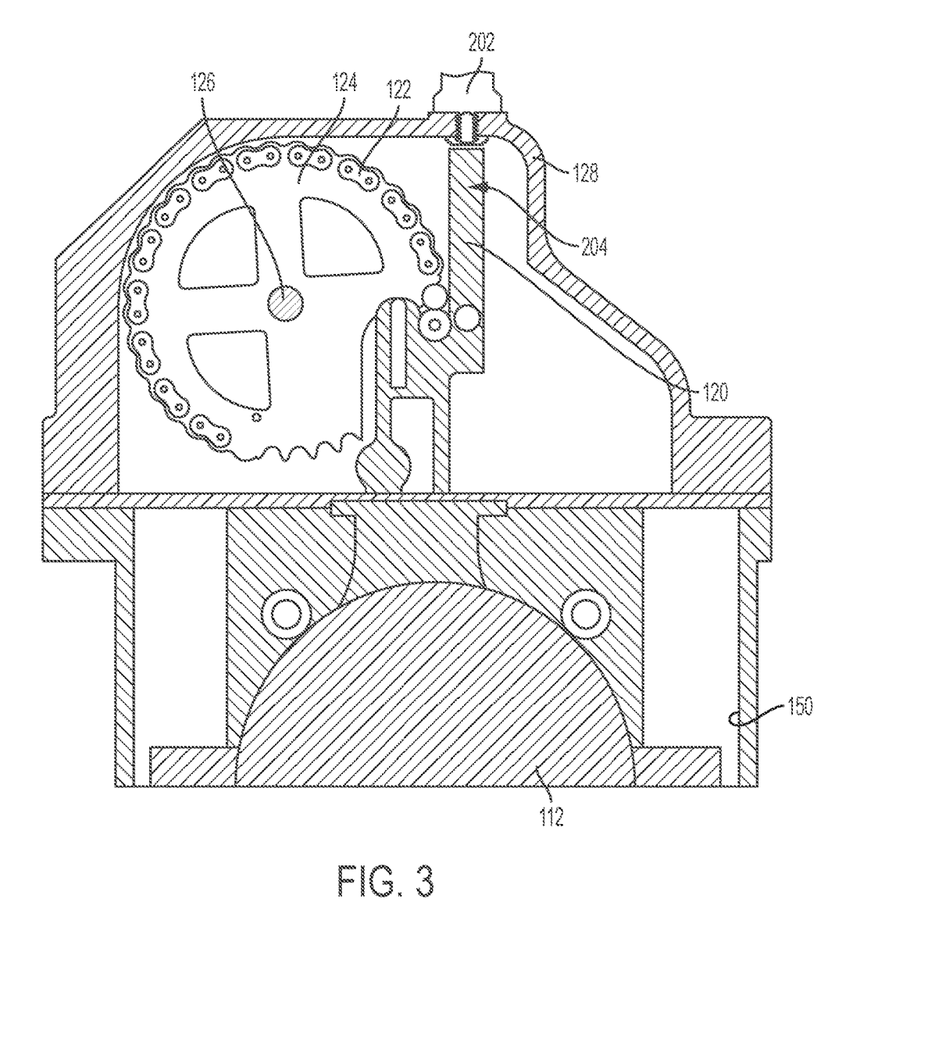
FIG. 3 is a cross section through the valve shown in FIG. 1.

During operation, the gate 112 may be raised or lowered, similar to a guillotine, with respect to the air passage 118 to open or block the air passage 118. As shown in FIG. 3, the gate 112 is connected to a lift rod 120, which pulls the gate 112 from the closed position to the open position and maintains the gate 112 in the lifted position. The lift rod 120 is connected to a chain 122 that meshably engages a sprocket 124 that pivots around a lift axle 126. The lift axle 126 serves as the axis of rotation for the sprocket 124 and is parallel to a plane defined by a retention pin axis, and perpendicular to a lift rod axis and an actuator axis. The lift and actuator axes are parallel and are both perpendicular to the retention pin axis. The lift, actuator and retention pin axes are coplanar. At one end, external to a cover 128, the lift axle 126 includes a driver 130 (FIG. 1), which can be engaged with a tool and turned to reset or lift the gate 112 to open the ASO 100 while the ASO 100 is in a closed position.

To activate or close the ASO 100, a signal may be provided to activate an actuator 132. The actuator 132, which is embodied in the illustrated device as an electrical solenoid actuator, is a linear actuator that operates to linearly displace a cam rod 134 (FIG. 4) between extended and retracted positions. Activation of the actuator 132 causes the cam rod 134 to retract in a downward direction in the orientation shown in FIG. 4. The cam rod 134 includes a cam surface 135 that contacts a roller 137. As can be appreciated, when the cam rod 134 is retracted (in a downward direction relative to the orientation shown in FIG. 4), contact between the cam surface 135 and the roller 137 will cause the roller 137 to move towards the right (in the orientation shown in FIG. 4). Similarly, extension of the cam rod 134 from the retracted to an extended position will allow the roller 137 to move towards the left.

Figure 4:
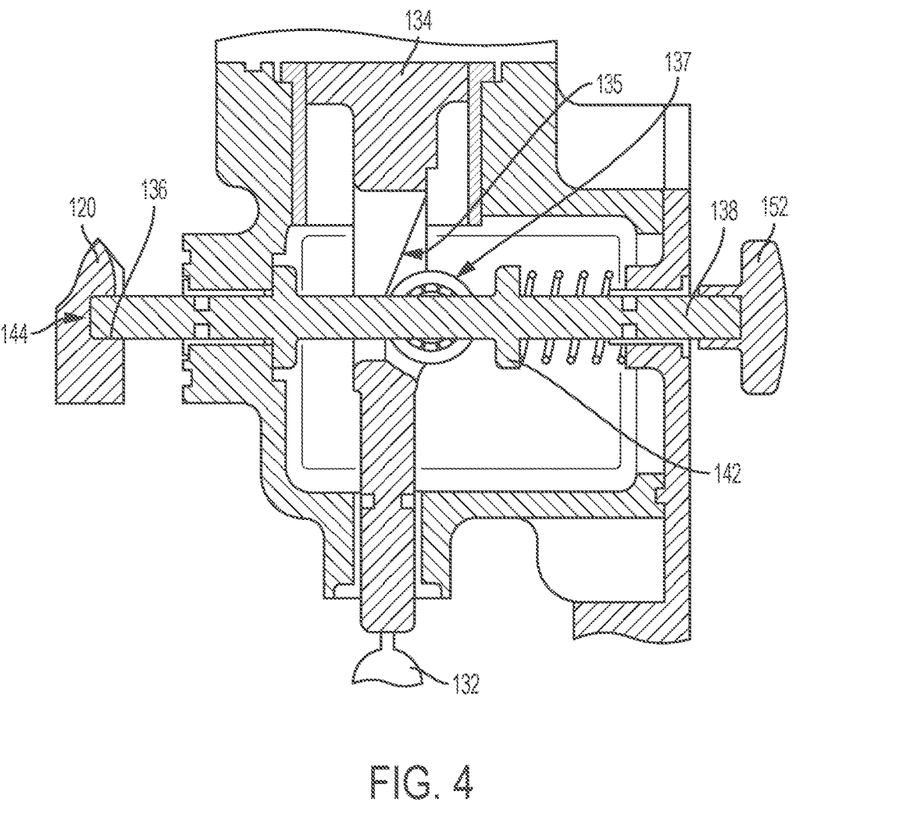
FIG. 4 is an enlarged detail cross section through a linkage portion of the valve of FIG. 1.

When in the default, extended position, the cam surface 135 of the cam rod 134 is disposed at a clearance distance from the roller 137. The roller 137 is rotatably mounted onto a retention pin 138. As also shown in FIG. 4, the retention pin 138 is reciprocally mounted within the ASO 100 in a perpendicular orientation relative to the cam rod 134 such that reciprocal motion of the cam rod 134 along one axis is translated into reciprocal motion of the retention pin 138 along a perpendicular axis by the interaction between the cam surface 135 and the roller 137. The retention pin 138 is also spring loaded by a spring 140 (FIG. 4), which is generally kept in a compressed state to maintain contact between the roller 137 and the cam surface 135. The spring restore force of the compressed spring 140 is communicated to the retention pin 138 via a flange 142.

When a signal is received at the actuator 132 to trigger or energize the ASO 100 to close, an electrical signal causes the actuator 132 to energize, which operates to retract the cam rod 134 towards the actuator 132 by a sufficient distance such that the cam rod 134 pushes the retention pin 138 sufficiently so that a tip of the retention pin clears an opening 136 formed in the lift rod 120. When the retention pin 138 has cleared the lift rod 120, the lift rod is free to move and allows the gate 112 to close.

When the retention pin 138 is in a locked position, an interference between a tip 144 of the retention pin 138 and the opening 136 formed in the lift rod 120 maintains the lift rod 120 and the gate 112 in the open position. When the tip 144 has cleared the opening 136, a mechanical retention of the gate 112 in the lifted position is removed, which permits the gate 112 to drop into the air passage 118. Motion of the gate 112 in the direction into the air passage 118 is effected by two lift springs 148, which are disposed in bores 150 formed in the gate portion 108 of the body 102 and which are in contact with the gate 112 and maintained in a compressed state when the gate 112 is in a lifted or open position. When the retention pin 138 is retracted sufficiently for the tip 144 to clear the opening 136, the gate 112 is free to drop and moves towards the closed position by force of the lift springs 148. In the illustrated embodiment, a handle 152 (FIG. 4) attached to an end of the retention pin 138 opposite the tip 144 may be manually pulled to retract the retention pin 138 and cause the release of the gate 112 as described above.

When the ASO 100 is in the triggered or closed position, it may be reset or rearmed manually. To accomplish this, a user may engage the driver 130, for example, with a wrench, and turn the driver 130 in a resetting or winding direction, for example, in a counter-clockwise direction in accordance with the orientation of parts shown in FIG. 3. The driver 130 is rotatably connected with the lift axle 126 such that rotation of the driver 130 causes the sprocket 124 to also rotate. For example, when rotating the driver 130 in the direction for resetting the valve, the sprocket 124 in the orientation shown in FIG. 3 will rotate counter-clockwise to wind the chain 122 onto the sprocket 124 and thus pull on the lift rod 120 to raise the gate 112. When the opening 136 in the lift rod aligns with the tip 144, the spring 140 will push the tip 144 into the opening 136 to secure the lift rod 120 in the open position.

INDUSTRIAL APPLICABILITY

The present disclosure is applicable to internal combustion engines and, more particularly, to ASO valves disposed to fluidly isolate engine cylinders from incoming air to prevent undesired operation of the engine.

Various structures for arming and resetting the ASO 100 are described above. The ASO 100 further includes additional structures and features that improve its performance and increase its service life. One such feature is a position sensor 202, which can be mounted on the cover 128. The position sensor 202, which can be embodied as a proximity sensor, is arranged to sense a target 204 and provide a signal when the target 204 is in a position at which the gate 112 is locked in its open position, as shown in the enlarged detail of FIG. 3. In the embodiment shown, the target 204 is formed as an extension of the lift rod 120.

Figure 5:
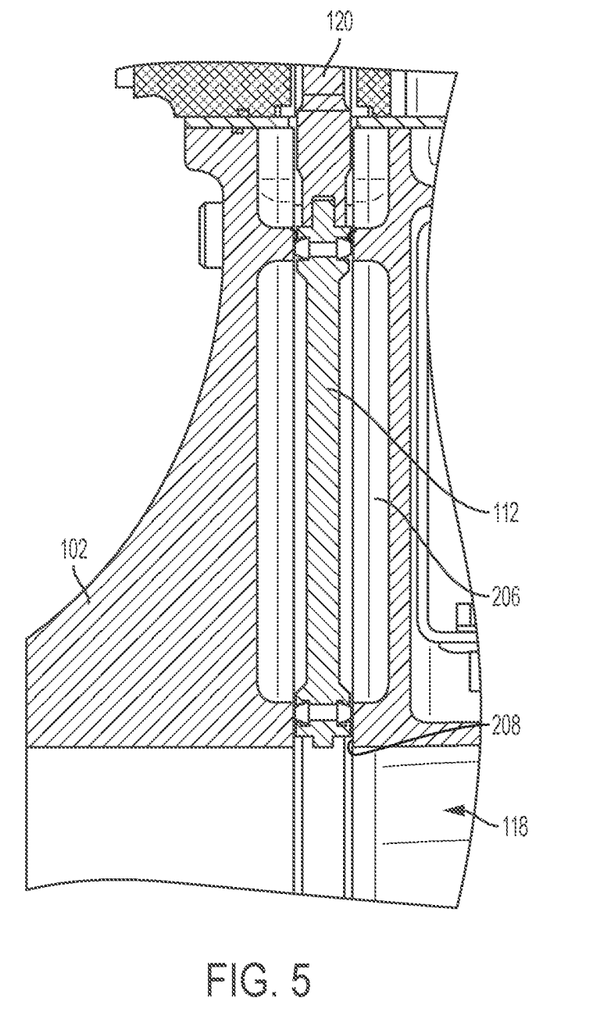
FIG. 5 is a cross section through a section of a gate element portion of the valve shown in FIG. 1.
Figure 6:
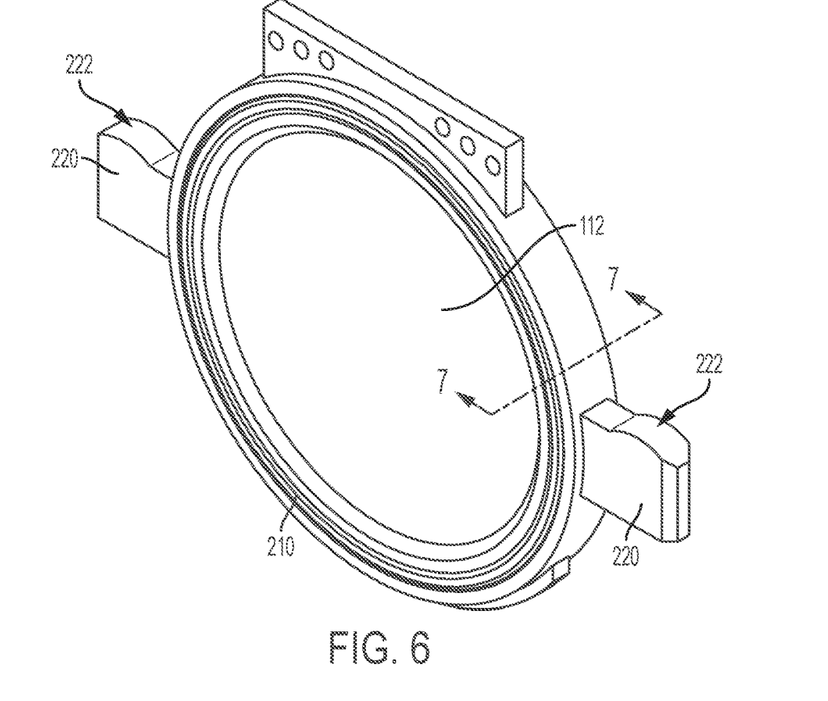
FIG. 6 is an outline view of a gate valve element.

Another feature of the ASO 100 includes an expansion chamber 206 and two annular sealing surfaces 208, which form a figure "8" and which discourage ingress of compressed air in the air passage 118, which may also contain other gasses such as recirculated exhaust gas and/or a gaseous engine fuel, into a cavity that houses the sprocket 124, chain 122 and a portion of the actuator 132. As shown in FIG. 5, the expansion chamber 206 is a blind chamber or cavity formed in the body 102 that can enclose the gate 112 when the gate 112 is in its open position. The gate 112 includes two face seals 210, one on either side of the gate 112, each of which having a circular shape that surrounds a periphery of the gate 112, as shown in FIG. 6.

During operation, the gate 112 can form a complete seal around its entire periphery and on both its upstream and downstream sides relative to the air passage 118. In the event any air or gas/air mixture leaks past the seals 210, especially when the gate 112 is in its open position, the expansion chamber 206 will serve to cool, expand and condense any fluids that are dissolved in the inlet air mixture to avoid contamination, corrosion and damage to the components operating the gate opening mechanism. For example, the inlet air mixture can include water vapors and also combustion by-products when exhaust gas recirculation is used, which by-products can include Sulphur oxides.

Figure 7:
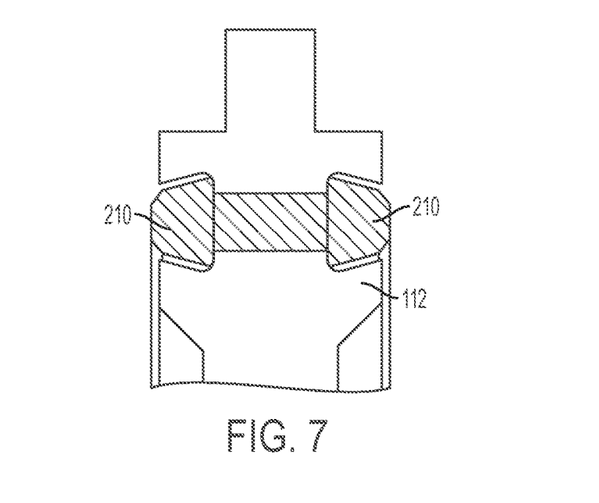
FIG. 7 is an enlarged cross section detail of a portion of the gate valve element shown in FIG. 6.

The seals 210 can be string seals accommodated in a channel, and may be formed by over-molding a seal material, such as a fluoro-elastomer, directly onto a gate 112, whereby both sides of the seal 210 can be formed in a single injection molding operation where the material passes from one side of the gate to the other through molding channels 212 formed peripherally around the gate 112, as shown in the cross section through the gate 112 in FIG. 7. In an alternative embodiment, the seals 210 may be made of a different material such as copper, graphite, ceramics and the like, which have an acceptable sealing performance and can withstand operation and maintain their sealing properties after prolonged operation at higher temperatures, for example, 300 deg. C., even in the presence of corrosive substances, without appreciable loss of their sealing ability.

Figure 8:
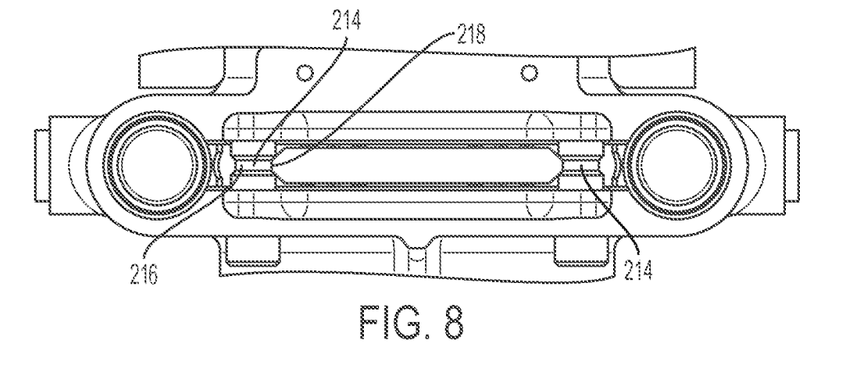
FIGS. 8 and 9 are cross sections from different perspectives of a gate portion of the valve shown in FIG. 1.
Figure 9:
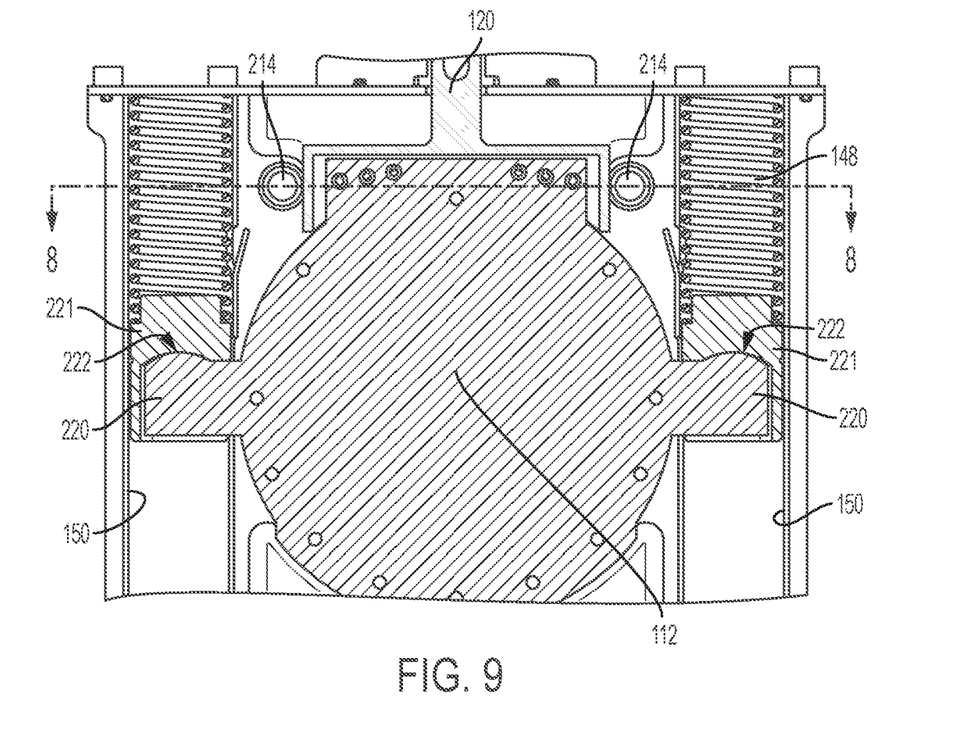
Figure 10:
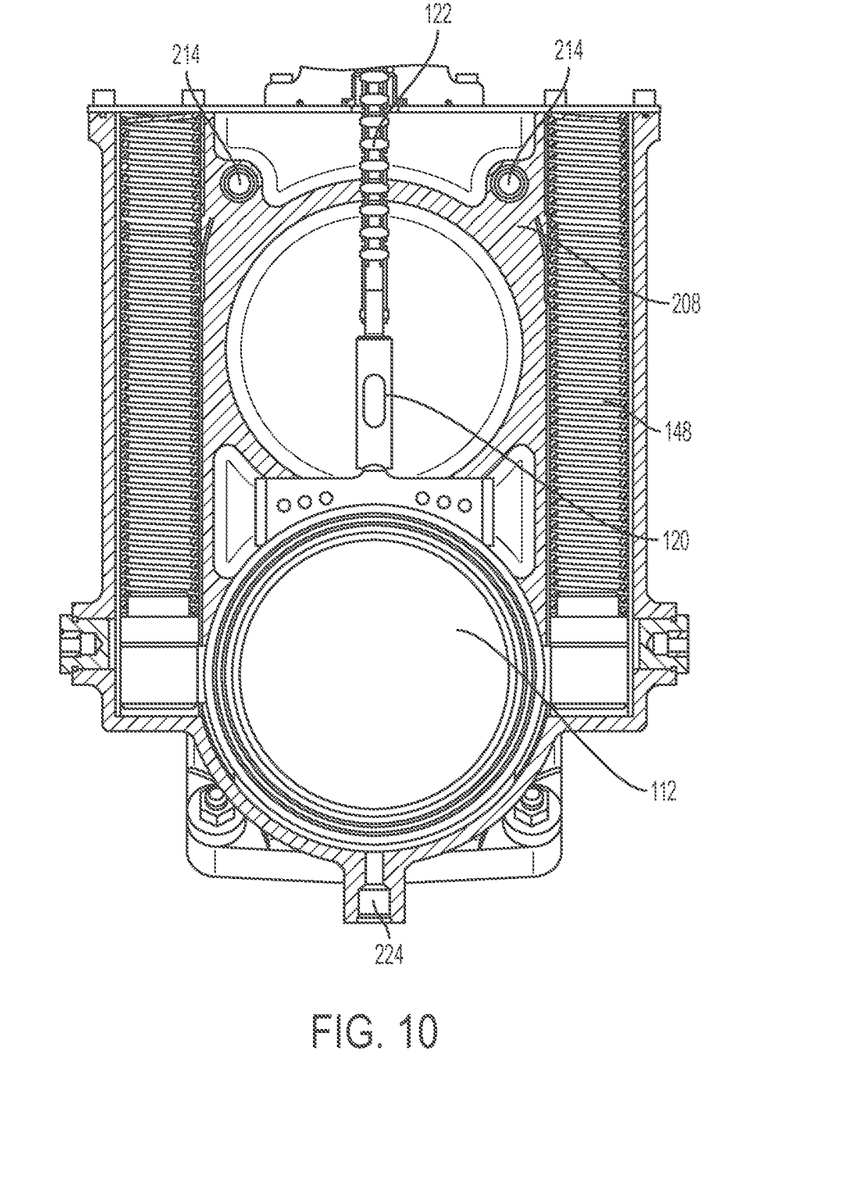
FIG. 10 is a cross section of the valve shown in FIG. 1.

For avoiding rattling and wear of the gate 112 when in the open or armed position due to vibration during operation, the ASO 100 further includes a plurality of resilient rollers 214. The placement of the rollers 214 for the illustrated embodiment can be seen in FIG. 10 from a front perspective, in the cutaway view of FIG. 8 from a top perspective, and in cross section from the front perspective in FIG. 9. The rollers 214 form a central channel 216 that engages a ridge 218 of the gate 112 such that motion and/or rotation in any direction except for the linear direction in which the gate lowers (downward, in the orientation of FIG. 9) is prevented or dampened by the resilience of the material of the rollers 214, which may be made of rubber, PTFE, Viton®, silicone, or the like.

To improve the operation of the ASO 100, the sliding mechanism between the gate 112 and the gate portion 108 of the body 102 includes a self-centering mechanism that ensures smooth and reliable valve activation regardless of installation or operation orientation of the ASO 100. More specifically, the gate 112 includes two diametrically opposite arms 220 (FIG. 6), which protrude radially with respect to the gate 112 and which interact with guides 221 (FIG. 9) that are slidably disposed within bores 150 formed in the body 102. The guides 221 matingly engage contoured surfaces 222 formed on each of the arms 220. The contoured surfaces 222 have a generally smooth concave shape, which approximates a circular segment such that an axial force applied by the springs 148 onto the gate 112 through the guides 221 and the arms 220 tends to center the guides 221 within the bores 150. As can be seen from FIGS. 9 and 15, the guides 221 also act as spring guides for the springs 148 and are thus subject to motion by a spring force when the springs 148 are extending, which motion is transferred to the gate 112.

For facilitating assembly of the various components in the ASO 100, a bore 224 is provided in the body 102. The bore 224, which can be plugged during operation of the ASO 100, is positioned along the air passage 118 at a position that overlaps the gate 112 and is disposed at a location that is diametrically opposite the lift rod 120. In this way, a tool, for example, a slender rod or bolt, can be inserted through the bore 224 and push the gate 112 towards its open position, and retain the same in that position while the remaining structures such as the sprocket 124 and chain 122 can be assembled.

For prolonging the service life and improving the viability and operation of the actuator 132, the ASO 100 includes heat shields 226 that at least partially surround the actuator 132 to shield the same from heat that may be emanating from the body 102 of the ASO 100 during operation. Moreover, the actuator 132 is placed such that the axis along which the retention pin 138 is actuated is parallel with the axis along which the gate 112 can move relative to the body 102. In this way, the length and orientation of the mechanical path of transmission of motion can be reduced and the actuator 132 can be placed closer to a center of mass of the ASO 100, which reduces the vibration and wear that the actuator might otherwise be subjected to.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An air shutoff valve for use on an internal combustion engine, comprising:
   a body having an inlet portion forming an inlet opening, an outlet portion forming an outlet opening, a gate portion and an actuator portion;
   the body forming an air passage that fluidly connects the inlet opening and the outlet opening;
   a gate slidably disposed in the gate portion of the body, the gate being selectively moveable between an armed position and a triggered position, in which triggered position the gate is disposed in the air passage and fluidly blocks the outlet opening from the inlet opening;
   a lift rod connected to the gate, the lift rod including a transverse opening;
   a retention pin slidably disposed in the actuator portion of the body, the retention pin having a tip extending through the transverse opening in the lift rod when the gate is in the armed position;
   a roller rotatably mounted to the retention pin;
   a cam rod having a cam surface in contact with the roller such that axial motion of the cam rod causes a corresponding axial motion on the retention pin;
   an actuator connected to the cam rod and operating to move the cam rod from the extended position to a retracted position, in which the tip of the retention pin is clear of the transverse opening;
   at least one spring disposed between the body and the retention pin, the at least one spring disposed to urge the retention pin in a direction towards the lift rod such that contact is maintained between the roller and the cam surface; and
   at least one lift spring disposed between the body and the gate, the at least one lift spring disposed to urge the gate towards the triggered position.

2. The air shutoff valve of claim 1, further comprising a linkage mechanism that operates to mechanically associate a position of the gate with a position of the retention pin relative to the body.

3. The air shutoff valve of claim 2, wherein the linkage mechanism includes a driver, and wherein rotation of the driver is configured to move the gate from the triggered position to the armed position and also to move the retention pin towards the transverse opening in the lift rod to lock the gate in the armed position.

4. The air shutoff valve of claim 3, wherein the linkage mechanism includes a sprocket rotatably mounted on the body and connected to the driver such that rotation of the driver causes a corresponding rotation of the sprocket.

5. The air shutoff valve of claim 4, wherein the linkage mechanism further includes a chain, which is meshably engaged with the sprocket, the chain having one end connected to the sprocket and another end connected to the lift rod such that rotation of the driver and sprocket in a winding direction causes the chain to pull onto the lift rod and move the gate from the triggered position towards the armed position.

6. The air shutoff valve of claim 1, wherein the body further includes at least one bore disposed in the gate portion and extending parallel to a travel direction of the gate, and wherein the at least one bore includes the at least one lift spring.

7. The air shutoff valve of claim 6, wherein the gate includes an arm that extends into the at least one bore, wherein a plug is slidably disposed within the at least one bore and contacts the arm, and wherein the at least one lift spring is compressively disposed between an end of the at least one bore and the plug.

8. The air shutoff valve of claim 4, further comprising a target disposed on the lift rod, the target being configured to be disposed adjacent a sensor when the gate is in the armed position.

9. The air shutoff valve of claim 1, further comprising an expansion chamber formed in the body and surrounding at least a portion of the gate when the gate is disposed in the armed position.

10. The air shutoff valve of claim 1, wherein the transverse opening is a blind bore extending at least partially the lift rod.

11. An air shutoff valve for an internal combustion engine comprising a gate valve element slidably disposed within a body of the valve and operating to selectively fluid connect or block an air passage, the gate valve element moving along a guillotine axis between a retracted position, in which the air passage is clear, and an extended position, in which the air passage is blocked, the air shutoff valve further comprising:
   a linear actuator operating between a default, extended actuator position and an active, retracted actuator position;
   a cam rod having a cam surface, the cam rod being connected to the linear actuator and arranged to be moved by the actuator;
   a retention pin slidably disposed in the body of the valve, the retention pin having a roller disposed in contact with the cam surface such that motion of the actuator translates into motion of the retention pin;
   at least one spring disposed between the body of the valve and the retention pin, the at least one spring urging the retention pin in one direction such that contact between the roller and the cam surface is maintained;

a lift rod connected to the gate valve element, the lift rod having an opening that accepts therein a tip of the retention pin; and at least one lift spring disposed between the body of the valve and the gate valve element, the at least one lift spring urging the gate valve element towards the extended position.

12. The air shutoff valve of claim 11, wherein in an armed state:

the linear actuator is in the extended position;

the tip of the retention pin is disposed within the opening in the lift rod, thus preventing the lift rod from moving relative to the body of the valve; and the at least one lift spring is compressed; and the gate valve element is disposed in the retracted position.

13. The air shutoff valve of claim 12, wherein during a trigger event:

the linear actuator is activated to move to the retracted position at least temporarily;

the cam surface pushes the roller, which also pushes the retention pin away from the lift rod;

the tip of the retention pin clears the opening in the lift rod, thus allowing the lift rod to move relative to the body of the valve; and the at least one lift spring is extended to push the gate valve element from the retracted position to the extended position.

14. The air shutoff valve of claim 13, wherein in a triggered state:

the linear actuator is free to move back to the extended position;

the retention pin is free to move into the opening of the lift rod when the opening becomes aligned with the tip; and the gate valve element is disposed in the extended position.

15. The air shutoff valve of claim 14, further comprising a sprocket rotatably disposed on the body, and a chain meshed with the sprocket and connected between the sprocket and an end of the lift rod, the sprocket further including a driver rotatably associated therewith and a pawl connected with the sprocket and extending radially outwardly therefrom, and wherein when transitioning from the triggered state to the armed state:

a user rotates the driver, thus rotating the sprocket in a winding direction;

the chain is taken up by the sprocket and pulls the lift rod and the gate valve element towards the retracted position;

the tip of the retention pin becomes aligned with the opening in the lift rod; and the at least one lift spring is compressed.

16. An air shutoff valve for an internal combustion engine, comprising:

a body forming an air passage that fluidly connects and inlet opening with an outlet opening;

a gate slidably disposed in the body and being selectively moveable along a gate axis between an armed position and a triggered position, in which the air passage is fluidly blocked;

a lift rod connected to the gate and including an opening;

a retention pin slidably disposed in the body along a retention axis and having a tip extending through the opening in the lift rod when the gate is in the armed position;

a roller rotatably associated with the retention pin;

a cam rod having a cam surface in contact with the roller;

an actuator connected to the cam rod and operating to move the cam rod along an actuator axis from the extended position to a retracted position;

at least one spring disposed between the body and the retention pin, the at least one spring disposed to urge the retention pin in a direction towards the lift rod such that contact between the roller and the cam surface is maintained; and at least one lift spring disposed between the body and the gate, the at least one lift spring disposed to urge the gate towards the triggered position;

wherein the gate axis and the actuator axis are parallel; and wherein the actuator axis and the retention axis are perpendicular.

17. The air shutoff valve of claim 16, wherein the gate, actuator and retention axes are coplanar.

18. The air shutoff valve of claim 16, further comprising a linkage mechanism that operates to mechanically associate a position of the gate with a position of the retention pin relative to the body, the linkage mechanism comprising:

a driver, wherein rotation of the driver is configured to move the gate from the triggered position to the armed position and also to move the retention pin towards the transverse opening in the lift rod to lock the gate in the armed position;

a sprocket rotatably mounted on the body and connected to the driver such that rotation of the driver causes a corresponding rotation of the sprocket; and a chain being meshably engaged with the sprocket, the chain having one end connected to the sprocket and another end connected to an end of the lift rod such that rotation of the driver and sprocket in a winding direction causes the chain to pull onto the lift rod and move the gate from the triggered position towards the armed position;

wherein an axis of rotation about which the sprocket rotates is parallel to a plane defined by the gate axis and the actuator axis.

19. The air shutoff valve of claim 18, further comprising a target associated with the lift rod, the target being adjacent a sensor when the gate is in the armed position.

20. The air shutoff valve of claim 16, further comprising an expansion chamber formed in the body and surrounding at least a portion of the gate when the gate is disposed in the armed position.

\* \* \* \* \*